United States Patent
Gawlick et al.

[15] 3,675,533
[45] July 11, 1972

[54] FASTENING MEANS SEVERABLE BY IGNITION OF AN EXPLOSIVE CHARGE

[72] Inventors: Heinz Gawlick, Boenerstrasse 32, Furth; Hellmut Bendler, Virchowstrasse 6, Nurnberg, both of Germany

[22] Filed: April 23, 1969

[21] Appl. No.: 818,520

[30] Foreign Application Priority Data

April 22, 1968 Germany .............. P 17 71 211.7

[52] U.S. Cl. .............. 89/1 B, 85/DIG. 1, 85/39, 89/1.5 F
[51] Int. Cl. .............. F16b 19/04
[58] Field of Search .............. 85/1, 39, DIG. 1; 89/1, 1.5, 89/1.01; 102/1

[56] References Cited

UNITED STATES PATENTS

| | | | |
|---|---|---|---|
| 2,065,333 | 12/1936 | Kirley | 85/39 |
| 2,556,672 | 6/1951 | Bergh et al. | 89/1.5 F X |
| 2,815,698 | 12/1957 | Burrows | 89/1.01 X |
| 3,119,298 | 1/1964 | Brown | 89/1.01 X |

*Primary Examiner*—Samuel W. Engle
*Attorney*—Craig, Antonelli & Hill

[57] ABSTRACT

A threaded fastener having means for effecting a severing thereof at a predetermined location upon the electrical ignition of an explosive charge, wherein an explosive cartridge is disposed within the body of the threaded fastener to cause a shearing off of the fastener at the desired location without destroying the external threaded portion of the fastener.

6 Claims, 11 Drawing Figures

PATENTED JUL 11 1972  3,675,533

INVENTORS
HEINZ GAWLICK
HELLMUT BENDLER

BY
Craig, Antonelli, Stewart & Hill
ATTORNEYS

3,675,533

FASTENING MEANS SEVERABLE BY IGNITION OF AN EXPLOSIVE CHARGE

BACKGROUND OF THE INVENTION

The present invention pertains to a screw or rivet or other threaded fastener which can be severed at a predetermined location by the electrical ignition of an explosive charge without destroying or severely damaging the external threaded portion thereof.

Prior attempts to produce a threaded fastener which can be severed by means of an explosive charge have proved unsuccessful. One of the primary disadvantages inherent within the attempts to provide such a threaded fastener has been the lack of reliability as to ensuring the shearing off of the threaded fastener at the desired location without excessively damaging the external or threaded portion of the fastener. Additionally, the threaded fasteners having explosive cartridge means incorporated therein in use heretofore have been so cumbersome as to preclude the construction of a fastener of this type with a relatively small shank diameter.

Accordingly, it is an object of the present invention to provide a threaded fastener incorporating an electrically ignitable explosive charge for effectively shearing off the fastener at a predetermined location upon the electrical ignition of the charge without excessively damaging the external threaded portion of the fastener.

Further, it is an object of the present invention to provide a fastener of the type described above which, by virtue of the novel and rugged construction thereof, facilitates the production of the fasteners with relatively small dimensions.

Finally, it is an object of the present invention to provide a fastener of the type described hereinabove which is relatively simple and inexpensive to produce and which is characterized by greater reliability than those in use heretofore.

SUMMARY OF THE INVENTION

The foregoing objects are accomplished, in accordance with the present invention, by disposing within a screw or rivet body an explosive charge and an electrical detonator and arranging these, with respect to a joint formed at the location where shearing is intended, such that only that portion of the weakened joint is sheared off upon ignition of the explosive charge, thus precluding excessive damage of the remaining portion of the fastener. The detonator employed in connection with the fastener constructed in accordance with the present invention is a primer cap operating on the basis of the aperture principle or, alternatively, a bridge fuse. Because of the novel design and rugged construction of the relatively small primer, it is possible to provide threaded fasteners of the type described above having a shank diameter as small as 7mm.

BRIEF DESCRIPTION OF THE DRAWINGS

The foregoing objects, features and advantages of the present invention will become more readily apparent from the detailed description hereinbelow, when considered in conjunction with the accompanying drawings, wherein.

DETAILED DESCRIPTION OF THE DRAWINGS

Figure 1:
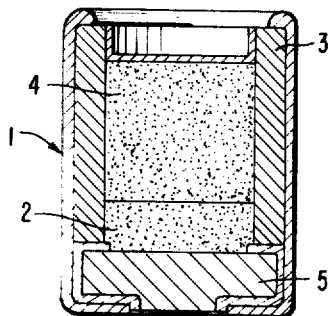
FIG. 1 represents a cross-sectional view of an explosive cartridge which can be employed in connection with the fastener constructed in accordance with the present invention.
Figure 2:
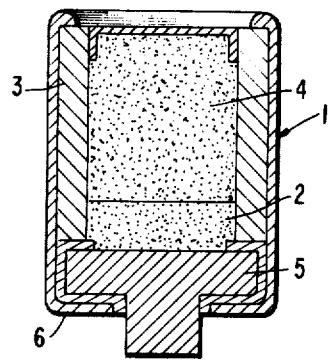
FIGS. 2 and 3 represent cross-sectional views through a modified cartridge adapted for incorporation within the fastener contemplated by the present invention.
Figure 3:
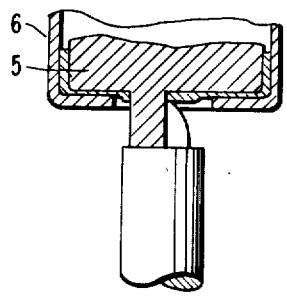

FIGS. 1, 2 and 3 illustrate a cartridge 1 including a conventional electrical primer cap 2 which detonate in accordance with the aperture principle; the primer cap 2 includes an extended metal portion 3 and encloses a charge of explosive powder 4. The pole piece 5 can be extended, as illustrated in FIG. 2, for making contact or, alternatively, it can serve, as illustrated in FIG. 3, as the lead wire. The various component parts are enclosed within cartridge case 6.

Figure 4:
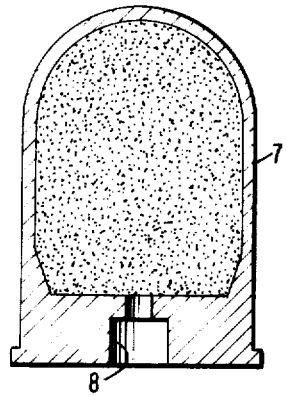
FIG. 4 represents a cross-sectional view through another type of explosive cartridge useful in conjunction with the present invention.

An alternative configuration of the explosive cartridge is represented in FIG. 4, wherein a conventional powder cartridge 7 is provided with an electrical detonator 8. This embodiment is contemplated for fastening elements of greater size which require a stronger explosive charge for effective severing.

Figure 5:
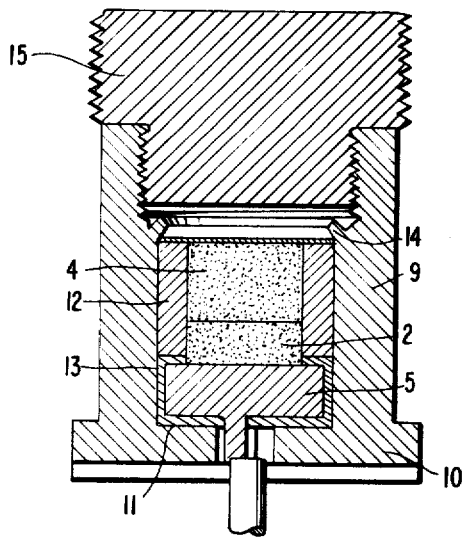
FIG. 5 represents a cross-section through a screw incorporating an explosive cartridge.

FIG. 5 illustrates a screw incorporating an explosive charge 4 therewithin. In this connection, the otherwise conventional cartridge case 6 is constructed in the form of a shank 9 and provided with a screw head 10. Within the shank 9, the pole piece 5 is provided, insulated with respect to shank 9 by means of an insulating insert 11. Between pole piece 5 and spacer ring 12, an insulating disk 13 is interposed. Shank 9 is riveted, at 14, thus firmly pressing spacer ring 12 against pole piece 5. After insertion of primer cap 2 and powder charge 4, the threaded portion 15 of the screw is fastened within shank 9. The fastening can be effected by threaded engagement, by metal cementing, by riveting, or other like methods.

Figure 6:
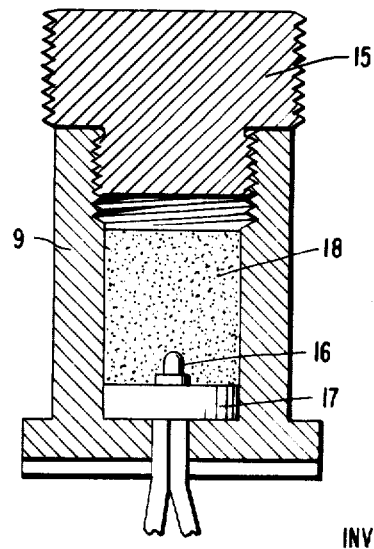
FIG. 6 represents a cross-sectional view through a screw provided with a bridge fuse-primed explosive cartridge.

In FIG. 6, an embodiment is illustrated incorporating a bridge fuse in place of the aperture primer means illustrated in FIG. 5. The primer pellet 16 is embedded within a part 17 formed from a synthetic material. The powder 18 required for effecting separation of the screw is disposed directly above the primer pellet 16. The embodiment according to FIG. 6 is simpler than that of FIG. 5, but does not exhibit the same strength during handling of the wire, because of the inherent instability of the bridge fuse utilized therein.

Figure 7:
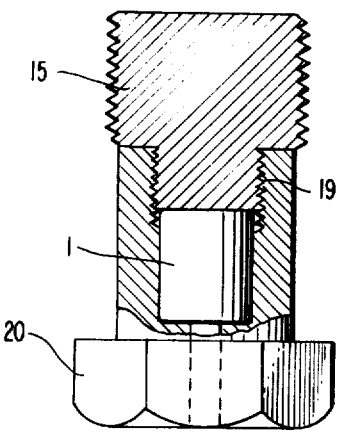
FIG. 7 represents a cross-sectional view through a machine screw incorporating an explosive cartridge.

The strength of screws or rivets constructed in accordance with the present invention depends upon the type and design of the connection of the component parts thereof. FIG. 7 illustrates a normal machine screw. The threaded portion 15 is provided with an additional thread 19 for joining the threaded portion 15 to the screw head 20 by means of threaded engagement after the cartridge 1 has been introduced therein. The cartridge 1 will, upon ignition, destroy the weaker thread 19 in the interior of the screw, thus causing a separation of the screw head 20 from the threaded portion 15.

Figure 8:
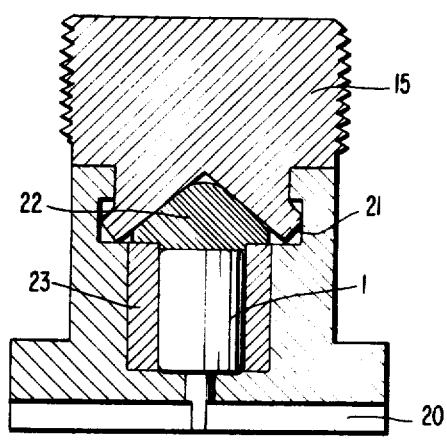
FIGS. 8 and 9 represent screws incorporating riveted joints adapted to be sheared off by the explosive cartridge disposed within the screw.
Figure 9:
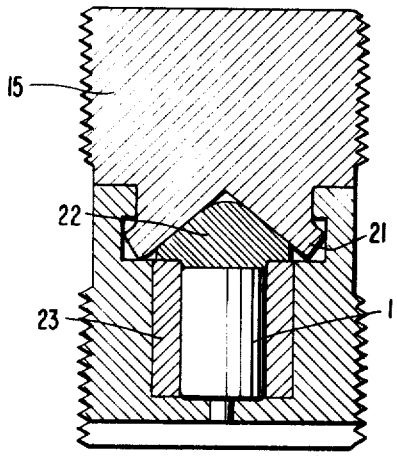
Figure 10:
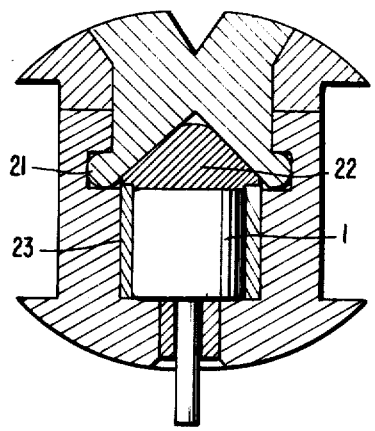
FIG. 10 represents a cross-sectional view through a rivet incorporating an explosive cartridge.

In FIGS. 8 and 9, a riveting 21 is provided in place of the secondary thread 19 for securing the component parts of the screws. A wedge 22 consisting of a stronger material effects, during compression, the riveting 21; for protection of the cartridge 1, the wedge 22 rests upon a steel ring 23. One embodiment of a rivet including an explosive cartridge therein is illustrated in FIG. 10.

Figure 11:
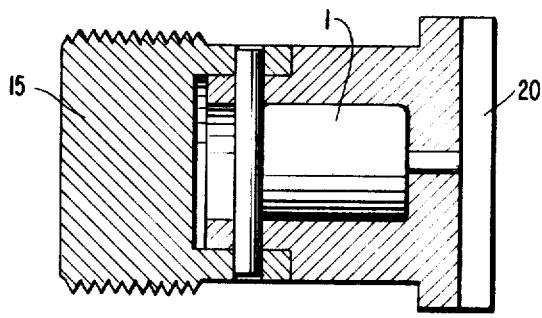
FIG. 11 represents a cross-sectional view through a screw having a pinned joint adapted to be sheared off by the explosion of the cartridge disposed within the screw.

In FIG. 11, the joint between the threaded portion 15 and the screw head 20 is effected by means of a pin 24. The gas pressure produced during ignition of the explosive charge is effective to cause the pin 24 to be sheared, thus effecting the separation of the threaded portion 15 from the screw head 20.

While the present invention has been described hereinabove with reference to but a few embodiments, it is to be understood that the scope of the invention is not limited to the specific details of the illustrated embodiments, but is susceptible of numerous changes and modifications as would be apparent to one with normal skill in the pertinent technology.

What is claimed is:

1. A fastening device having means for causing separation thereof at a predetermined location, comprising: first and second portions, each portion having external fastening means adapted to respectively engage two structures to be fastened together, said first portion defining an internal chamber, explosive charge means disposed within said internal chamber and means for selectively detonating said explosive charge means, said first portion and said second portion having internal detachable riveted connecting means, said connecting means adapted to be destructively disconnected upon detonation of the explosive charge means, said connecting means forming a gas-tight seal about the explosive charge means to preclude the premature escape of the explosion pressure gases upon detonation of the explosive charge means, said connecting means including wedge means disposed within the internal chamber of said first portion for cooperating with said riveted connecting means, further characterized in that protective means are disposed in the internal chamber of said first portion to protect the explosive charge during assembly of the device, said protective means including rigid abutment means extending between said wedge means and a part of said first portion.

2. A device as in claim 1, further characterized in that said protective means is a metal ring disposed about said explosive charge and in engagement with both said wedge means and with the end walls of the internal chamber.

3. A device as in claim 1, further characterized in that said external fastening means includes thread means and screw head means, respectively.

4. A device as in claim 1, further characterized in that said external fastening means includes rivet heads.

5. A device as in claim 1, further characterized in that said external fastener means includes thread means on each of the two portions.

6. A device as in claim 1, further characterized in that said means for selectively detonating said explosive charge means includes electrical control means.

* * * * *